United States Patent [19]
Liu

[11] Patent Number: 6,087,982
[45] Date of Patent: Jul. 11, 2000

[54] RADAR SCAN CONVERTER AND METHOD OF MIXING IMAGE

[75] Inventor: Guang-Sheen Liu, Taoyuan Hsien, Taiwan

[73] Assignee: Chung-Shan Institute of Science and Technology, Taoyuan, Taiwan

[21] Appl. No.: 09/322,074

[22] Filed: May 27, 1999

[51] Int. Cl.[7] .................................................. G01S 7/298
[52] U.S. Cl. ........................ 342/185; 342/195; 342/183; 342/179
[58] Field of Search ........................... 342/175, 176, 342/179, 181, 182, 183, 185, 186, 194, 195, 197

[56] References Cited

U.S. PATENT DOCUMENTS

| | | | |
|---|---|---|---|
| 4,697,185 | 9/1987 | Thomas et al. | 342/185 |
| 4,845,501 | 7/1989 | Pease et al. | 342/185 |
| 4,931,801 | 6/1990 | Hancock | 342/185 |
| 5,341,141 | 8/1994 | Frazier et al. | 342/59 |
| 5,418,535 | 5/1995 | Masucci et al. | 342/185 |
| 5,502,576 | 3/1996 | Ramsay et al. | 358/444 |
| 5,734,754 | 3/1998 | Parker | 382/243 |

FOREIGN PATENT DOCUMENTS 9501579A  10/1996  Sweden ............................ G01S 7/22

*Primary Examiner*—John B. Sotomayor
*Attorney, Agent, or Firm*—J. C. Patents; Jiawei Huang

[57] ABSTRACT

A radar scan converter and method of mixing image. By inserting a radar scan converter (RSC) card in a personal computer, an input video such as a radar video or supersonic video can be mixed on a screen of the personal computer without deteriorating the current graphic, such as range rings, plots, tracks, and symbols. An analog-to-digital converter, a radial buffer, a decimation filter, a coordinate converter and an overlay processor are used in the radar scan converter. The overlay processor read a display memory on a display card according to a triangular coordinate generated by the coordinate converter. The read data from the display memory is then compared. When the read data do not contain either text or graphic, a data processed by the decimation filter is written into the display memory.

14 Claims, 5 Drawing Sheets

RADAR SCAN CONVERTER AND METHOD OF MIXING IMAGE

BACKGROUND OF THE INVENTION

1. Field of the Invention

The invention relates in general to a radar scan converter (RSC). More particularly, to a radar scan converter and a method of directly overlaying a video on a screen of a personal computer without deteriorating the original graphic.

2. Description of the Related Art

The conventional radar display is a cylindrical cathode ray tube (CRT). A CRT screen has a beam spinning synchronously with the antenna. A target is displayed on the beam and vanishes automatically after a while. This kind of display apparatus is called plan position indicator (PPI). Since PPI achieves the objective of a delay of target vanishment based on the persistence of a phosphor, the brightness is often low to demand a dim environment. Moreover, the cost of this kind of CRT is high.

To overcome the problems of PPI, various kinds of digital scan converters (DSC) have been developed. DSC converts the radius and angle of the beam into corresponding X- and Y-coordinates of a TV monitor. In addition, being referenced by a recording technique of computer video, for example, multi-color display, overlaying window, and adding text onto the display, the radar display is integrated.

FIG. 1 is a block diagram showing function of a conventional digital scan converter. The digital scan converter 10 comprises an analog-to-digital (A/D) converter 12, a radial buffer 14, a decimation filter 16, a control unit 18, a coordinate converter 20, a frame buffer 22, a memory/display timing generator 24 and a digital-to-analog (D/A) converter 26. Being digitized by the A/D converter 12, a radar video is stored in the radial buffer 14. The data stored in the radial buffer 14 are then processed by the decimation filter 16 according to a predetermined display range.

An azimuth information of radar, the AZ synchronous signal (AZ sync), comprises an azimuth reference pulse (ARP) and an azimuth change pulse (ACP). When the antenna is spinning, there are 4096 ACP and 1 ARP per revolution. The ARP appears while the antenna spins towards the true north direction. A trigger signal (Trigger) indicates the moment while radar wave is emitted, that is, Trigger coincident with range zero. According to the AZ sync, the coordinate converter 20 calculates a coordinate (R,Θ) in a polar coordinate system and converts it into a coordinate (X,Y) in a Cartesian coordinate system.

Using the coordinate (X,Y) in the Cartesian coordinate system as an address, the memory/display timing generator 24 stores the data being processed by the decimation filter 16 into the frame buffer 22. In addition, the memory/display timing generator 24 undertakes access of the data stored in the frame buffer 22 and generation of a TV synchronous signal (TV sync). The output of the frame buffer 22 is a digital signal. The D/A converter 26 converts this digital signal into an analog signal which is then sent to a TV monitor together with the TV sync. Similar structures of the DSC have been disclosed in U.S. Pat. Nos. 4,754,279, 4,729,029, 4,675,679, 4,434,422, 4,412,220, 4,220,969, 4,065,770 and 4,002,827.

The coordinate converter 20 is one of the characteristics of DSC. Conventionally, the polar coordinate (R,Θ) can be converted into the Cartesian coordinate (X,Y) with multipliers and Look Up table established by sine and cosine functions. In U.S. Pat. No. 4,729,029, an adders are used to simplify and speed up the conversion. The following patents such as U.S. Pat. Nos. 4,697,185, 4,931,801, 5,519,401, 5,530,450 and 5,554,992 further discloses methods to overcome the problems of overwriting and spoking.

In addition, the frame buffer 22 is a key module for signal flow. Since the structure of memory directly affects the process speed of signal, resolving methods have been disclosed in U.S. Pat. Nos. 4,220,969, 4,065,770 and 4,002,827.

As the technique of electronic device becomes more and more advanced, the computer becomes more and more powerful. With the disclosure of VME bus, a combination of a DSC and a computer workstation becomes a trend. FIG. 2 shows a functional block diagram of a radar scan converter comprising an analog multiplexer (MUX).

Similar to FIG. 1, U.S. Pat. No. 5,418,535 discloses a method of forming a DSC into a VME bus, wherein the DSC is incorporated with an overlay function which can mix the images of the radar video and the workstation and send the mixed image to the monitor. The method of overlay comprises combining of the video of D/A converter output and the graphics of workstation 32 to a multiplexer 34, and determining the switching of the multiplexer 34 according to the voltage level of the graphics. The technique terminology of "RSC" is commonly used in this stage of development.

In the current chapter of multi-media computer, many patents have disclosed methods of overlaying video of TV camera and computer graphic. A multiplexer is used to perform the overlay. In Taiwanese Patent No. 264,548, U.S. Pat. Nos. 5,398,075 and 5,220,312, analog image overlay is adopted, while Taiwanese Patent No. 286,381 and U.S. Pat. No. 5,598,525 belong to a digital image overlay since a digital multiplexer is in use.

The analog multiplexer which adopts a current summing approach comprises a high speed switch device. Since the high speed switch device has a nonlinear impedance, distortion is resulted in the image. In addition, the low-pass filtering effect of limited bandwidth components results in the blurring and smearing of image. For a screen with a resolution of 1280×1024 and a vertical frequency of 60 Hz, the pixel frequency is 108 MHz. It is known that a switch delay of 10 ns would cause the image to shift with one pixel position. Therefore, the switch frequency of the multiplexer is required as high as 100 MHz. To avoid distortion and noise, the bandwidth and linearity have to be enhanced. This further increases the circuit complexity and the fabrication cost.

Based on the problems as described above, a digital multiplexer is used instead of an analog one. FIG. 3 shows a functional block diagram of a conventional radar scan converter comprising a digital multiplexer. A D/A converter 40 is disposed behind a digital multiplexer 42, and a color key comparator 44 determine the switching of the digital multiplexer 42 according to color bits of graphic, for example, 8, 15, 16 or 24 bits.

In FIG. 3, a digital graphic is sent from the workstation 46 to the RSC 48 via a feature connector (not shown). The frequency of the feature connector is limited at 45 MHz. However, the transmission of an analog signal between the workstation 46 and the RSC 48 can reach as high as 135 MHz.

There is another problem of the above feature connector. In response with video graphics array (VGA) card with different brand name, the transmission format of the digital graphic may be 8, 15, 16 or 24 bits, and the settling time and holding time of pixel clock of various VGA card are different. To moderate the problem of incompatibility, the pixel clock and digital graphic has to be re-buffered and regenerated. This increase the cost and complexity of RSC card further.

From the above introduction, the conventional RSC comprises a frame buffer, a multiplexer, a color key comparator and a D/A converter. The relative circuit of the frame buffer comprises random access memory (RAM), address register, read/write controller and timing generator. The memory structure affects the path and speed of signal processing, and hence, the circuit is complex.

SUMMARY OF THE INVENTION

The invention provides a radar scan converter comprising an analog-to-digital converter, a radial buffer, a decimation filter, a coordinate converter and an overlay processor. Being received by the A/D converter, a radar video in an analog form is converted into a digital form. The digital radar video is then fed into the radial buffer. The decimation filter is coupled to the radial buffer, so as to perform a decimation process on the radar video stored in the radial buffer according to a preset display range. The coordinate converter receives an azimuth synchronous signal which reflects an azimuth information of the radar video. A polar coordinate of the radar video is then converted to a Cartesian coordinate thereby. The overlay processor is used to read the display memory of the video graphics array VGA card according to the rectangular (Cartesian) coordinate generated by the coordinate converter. The read data is compared. When the read data do not contain text or graphic, a data generated by the decimation filter is written into the display memory.

The invention further provides an image mixing method to directly overlay an input video such as a radar video or supersonic video onto a screen of a personal computer without deteriorating the current graphic. An AZ synchronous reflecting an azimuth information of an input video is provided. According to a preset display range, the input video is processed by a decimation filter. A polar coordinate of the input video is calculated and converted into a Cartesian coordinate by a coordinate converter. The display memory of the personal computer is read according to the Cartesian coordinate. The read data of the display memory is compared, so that the input video is written into the display memory when the read data do not contain text or graphic.

A novel image mixing method suitable for being use in a radar scan converter is thus provided. The problems such as increasing cost and complex circuit techniques occur for the conventional radar scan converter are resolved. In addition, an image overlay is achieved. An input radar video or supersonic video can be directly overlaid onto a screen of a personal computer without deteriorating the current graphic such as range ring, plots, tracks and symbols. In addition, the application of a frame buffer, a memory/display timing generator and a D/A converter can be saved to reduce the cost.

Both the foregoing general description and the following detailed description are exemplary and explanatory only and are not restrictive of the invention, as claimed.

DESCRIPTION OF THE PREFERRED EMBODIMENTS

Figure 1:
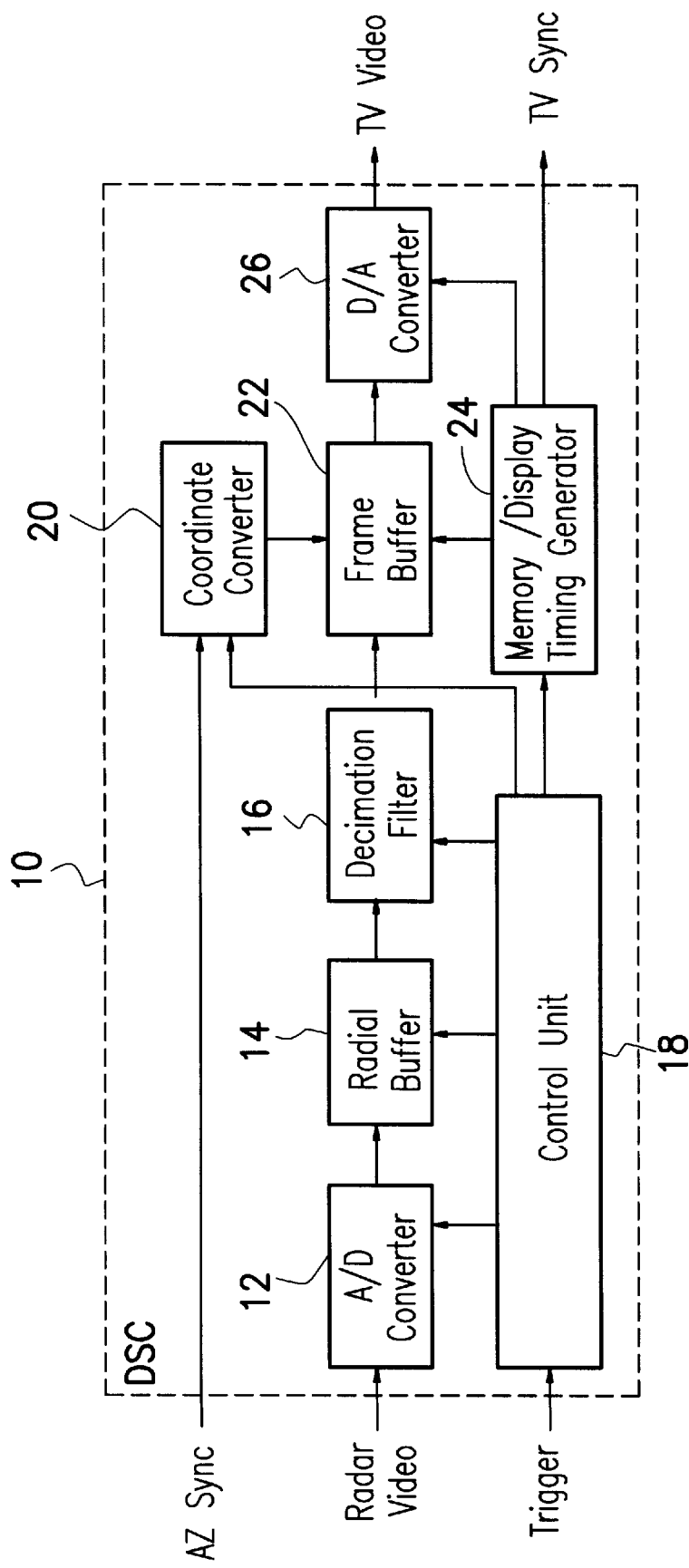
FIG. 1 shows functional block diagram of a conventional digital scan converter.
Figure 2:
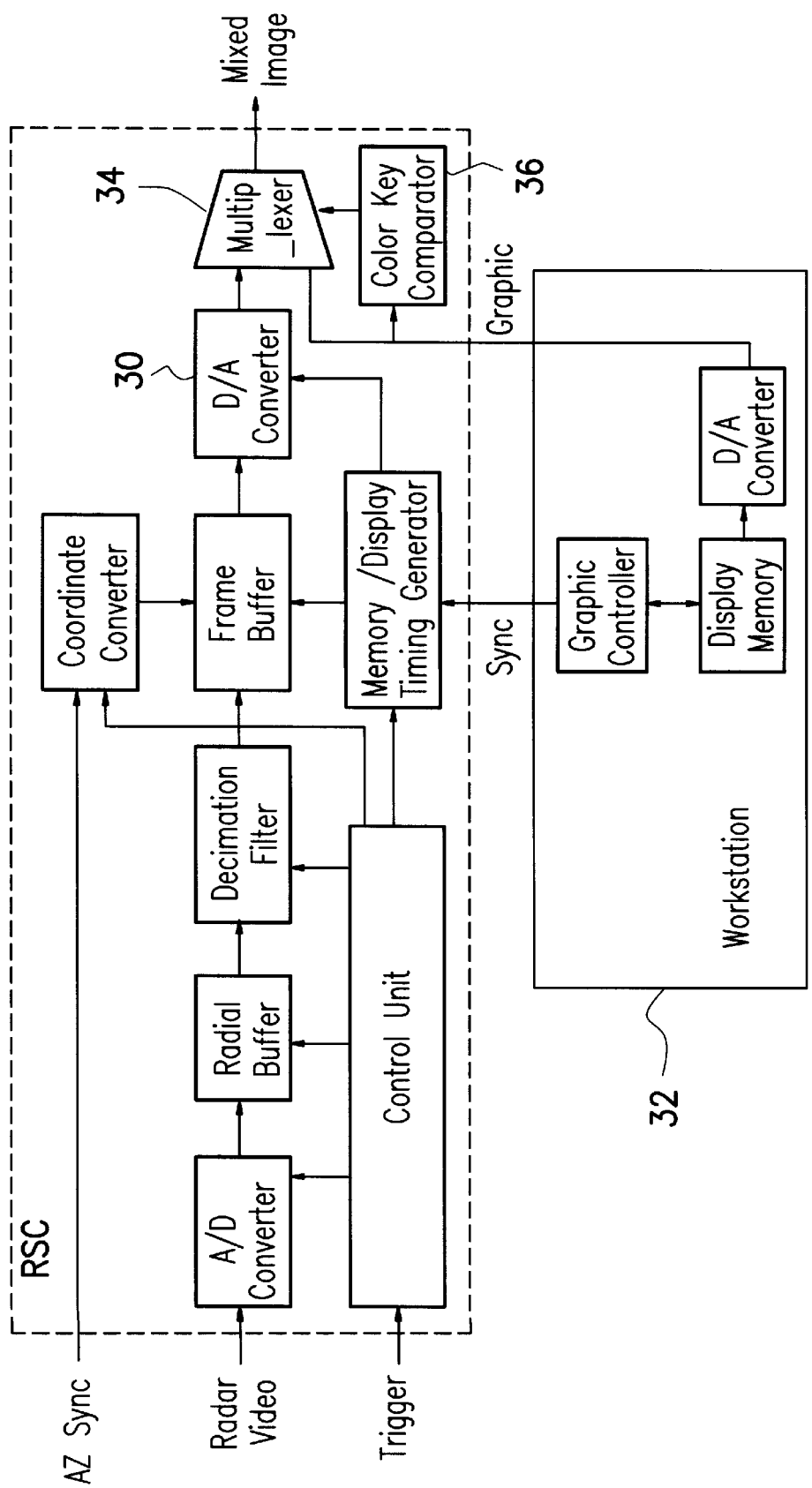
FIG. 2 shows a functional block diagram of a conventional radar scan converter comprising an analog multiplexer.
Figure 3:
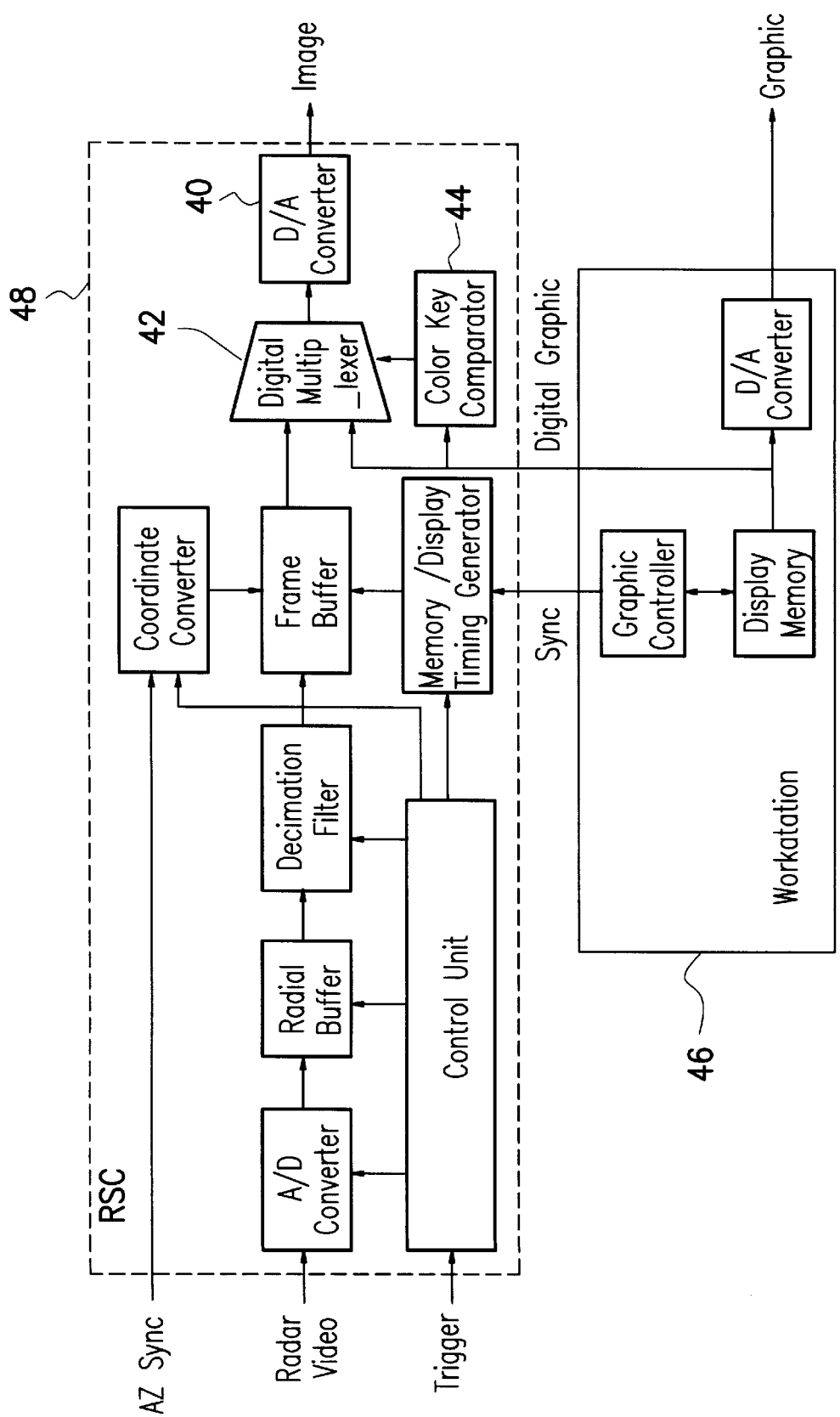
FIG. 3 shows a functional block diagram of a conventional radar scan converter comprising a digital multiplexer.
Figure 4:
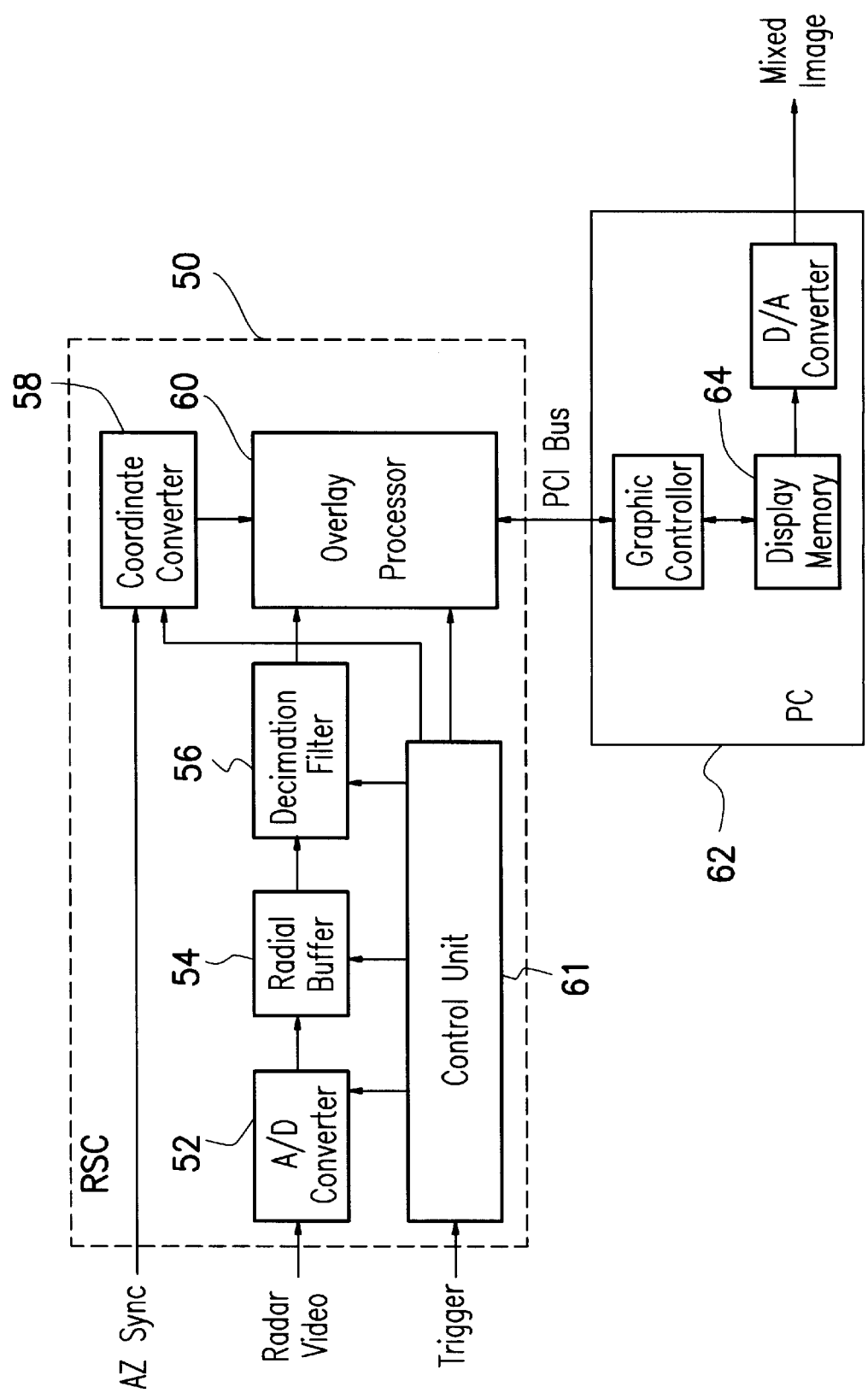
FIG. 4 shows a functional block diagram of a radar scan converter in a preferred embodiment according to the invention.

In FIG. 4, a block diagram showing the functions of a radar scan converter provided by the invention is presented. For the purpose of fully utilizing a PCI bus, the display and overlay of images are performed on a video graphics array card (VGA card). A RSC card 50 comprises an A/D converter 52, a radial buffer 54, a decimation filter 56, a coordinate converter 58 and an overlay processor 60. The RSC card 50 further comprises a control unit 61 to receive a trigger signal, so as to control the operation of the A/D converter 52, the radial buffer 54, the decimation filter 56, the coordinate converter 58 and the overlay processor 60. The trigger signal "Trigger" indicates the moment when a radar wave is emitted, that is, the trigger signal coincident with range zero.

As shown in FIG. 4, the radial buffer 54 is coupled to the analog-to-digital converter 52 which is further connected to the decimation filter 56. A control unit 61 is coupled to the analog-to-digital converter 52, the radial buffer 54, the decimation filter 56, the coordinate converter 58 and the overlay processor 60. Furthermore, the overlay processor 60 is connected to both the coordinate converter 58 and the decimation filter 56.

Being digitized by the A/D converter 52, a radar video is fed into the radial buffer, and then processed by the decimation filter 56 according to a preset display range. An AZ synchronous signal reflects an azimuth information of the radar antenna. A polar coordinate (R,Θ) is obtain being calculated by a counter (not shown) of the coordinate converter 58. The polar coordinate (R,Θ) is converted into a Cartesian coordinate (X,Y) by the coordinate converter 58. The overlay processor 60 is used to read a display memory 64 of the VGA card installed in a personal computer 62 according to the Cartesian coordinate (X,Y) generated by the coordinate converter 58. The read data of the display memory 64 is then compared. When the read data do not contain any text or graphic, the radar video processed by the decimation filter 56 is written into the display memory 64.

Figure 5:
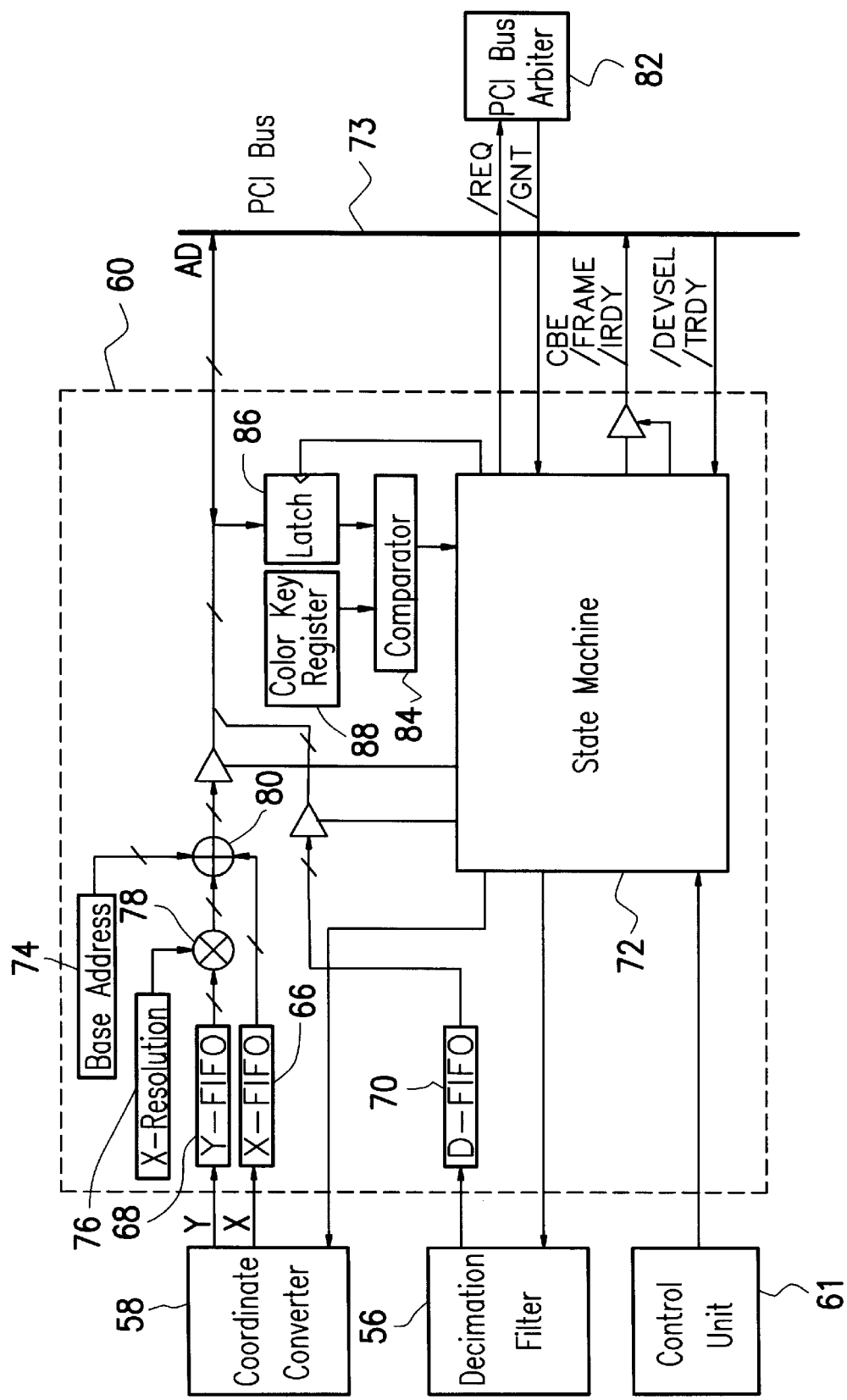
FIG. 5 shows a functional block diagram of an overplay processor in the radar scan converter as shown in FIG. 4.

FIG. 5 shows a block diagram illustrating functions of the overlay processor 60 as shown in FIG. 4. Referring to both FIG. 4 and FIG. 5, the overlay processor 60 comprises an X first-in-first-out memory 66 and a Y first-in-first-out memory 68 coupled to the coordinate converter 58, and a D first-in-first-out memory 70 coupled to the decimation filter 56. Further in the overlay processor 60, a multiplier 78 has input terminals connected to the Y first-in-first-out memory 68 and X-resolution register 76. Whereas, an adder 80 has input terminals coupled to the X first-in-first-out memory 66 a base address register 74 and an output terminal coupled to the signal line AD. The overlay processor 60 further comprises a latch 86 coupled to the signal line AD, a color key register 88, a comparator 84 coupled to the latch and the color key register 88, and a state machine 72 coupled to the comparator 84.

In the overlay processor 60, the rectangular coordinate (X,Y) generated by the coordinate converter 58 is stored in the X first-in-first-out memory 66 (X-FIFO) and the Y first-in-first-out memory 68 (Y-FIFO), while the processed radar video processed by the decimation filter 56 is stored in the D first-in-first-out memory 70 (D-FIFO). The state machine 72 is used to handle the overall timing.

A base address 74 as shown in FIG. 5 is an initial address of the display memory 64. An X resolution 76 indicates a resolution, for example, 1280, along the X-direction of the screen. The address of the display memory 64 can be calculated by processing the rectangular coordinate (X,Y) stored in the X-FIFO 66 and the Y-FIFO 68 with a multiplier 78 and an adder 80. The state machine 72 sends a request signal /REQ to a PCI bus arbiter 82. After receiving an grant signal /GNT from the PCI bus arbiter 82, the address of the display memory 64 is output through a signal line AD. Meanwhile, signal lines CBE, /FRAME and /IRDY are sending relative information for reading the memory. When the state machine 72 observes the signal lines /DEVSEL and /TRDY to obtain a message that the pixel is read on the signal line AD of the PCI bus 73, a latch 86 latches the pixel data on the signal line AD. The pixel data is sent to a comparator 84 to compare with a data stored in a color key register 88. The comparison result shows whether an overlay is allowed. For example, provided a palette having 256 colors which has 0–127 of colors which is not deteriorated for being rewritten and 128–256 greys which can be deteriorated for being rewritten. When the pixel data do not included in the color key range (0–127) of the color key register 88, a write operation is performed on the display memory.

To write the memory is similar to read the memory. Again, the state machine 72 send a request signal /REQ to PCI arbiter 82. After receiving the grant signal /GNT, the address and the data is output via the signal line AD. Meanwhile, the signal lines CBE, /FRAME and /IRDY send relative information to perform a write operation on the memory.

The overlay processor 60 directly accesses the display memory 64 of the VGA card of the personal computer 62. About 16 bus cycles, that is, about 16×30 ns=0.5 $\mu$s, are required for one read/compare/write operation. Assuming that the screen provides a display range of 1024×1024 pixels for radar video, each scan displays 3.14×512×512=823K pixels if overwriting and spoking filling is considered within coordinate converter. Thus, during the period of each scan, the PCI bus is occupied for about 823K×0.5 $\mu$s=0.412 sec. Thus, a highest tolerable scan speed is about 145 rpm.

In the invention, the overlay processor 60 and the CPU in the motherboard share the PCI bus 73. The use authority of the PCI bus 73 is arbitrated by the PCI bus arbiter 82. Each time when the overlay processor 60 sends a request to the PCI bus arbiter 82, 3–10 cycles are required for a grant of the PCI bus arbiter 82. From the empirical result, 20–24 bus cycles are required for each read/compare/write operation. As a consequence, the PCI bus 73 is occupied for about 823K×26 ×30 ns=0.6 sec sec for each scan cycle. Thus, the highest tolerable scan speed is about 100 rpm.

Currently, the frequency of the PCI bus is 33 MHz. An AGP port is more and more commonly used. Therefore, the application of a PCI bus in the invention is more versatile. The tolerable scan speed can be further enhanced. The frequency of the PCI bus is raised up to 66 MHz, or even to 133 MHz in the PCIX specification. Consequently, the tolerable scan speed can be further enhanced.

Therefore, the invention achieve the objective of overlaying image to directly overlay an input video, for example, a radar image or supersonic image onto a screen of a personal computer. The range ring, plots, tracks and symbols are not to be deteriorated or blotted by the overlay. Furthermore, the frame buffer, memory/display timing generator and D/A converter are not used, so that drawbacks and problems discussed as above can thus be resolved by the invention.

The invention thus provides a method for mixing image suitable for use in a radar scan converter which has a different structure from the conventional one. An input video can be mixed onto a screen of a personal computer directly without deteriorating or blotting the original graphic on the screen. Furthermore, the problems such as an increased cost and complex circuit are resolved.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A radar scan converter coupled to a personal computer, comprising:

an analog-to-digital converter, receiving an analog signal of a radar video and converting the analog signal of the radar video into a digital signal of the radar video;

a radial buffer, coupled to the analog-to-digital converter to receive the digital signal of the radar video;

a decimation filter, coupled to the radial buffer to decimate the radar video stored in the radial buffer according to a preset display range;

a coordinate converter, to receive an AZ synchronous signal to calculate a polar coordinate of the radar video, and to convert the polar coordinate of the radar video into a Cartesian coordinate; and an overlay processor for mixing image, coupled with the decimation filter and the coordinate converter, to read a display memory in the personal computer according to the Cartesian coordinate generated by the coordinate converter, and to compare a pixel data read from the display memory.

2. The radar scan converter according to claim 1, comprises further a control unit to control operations of the analog-to-digital converter, the radial buffer, the decimation filter, the coordinate converter, and the overlay processor.

3. The radar scan converter according to claim 1, wherein the radar scan converter is connected to the personal computer via a PCI bus.

4. The radar scan converter according to claim 1, wherein the display memory is disposed on a video graphics array card.

5. The radar scan converter according to claim 1, wherein a data processed by the decimation filter is written into the display memory when the pixel data read from the display memory do not contain text and graphic.

6. The radar scan converter according to claim 1, wherein the overlay processor comprises:

an X first-in-first-out memory and a Y first-in-first-out memory, coupled to the coordinate converter to store the Cartesian coordinate generated by the coordinate converter;

a D first-in-first-out stack, coupled to the decimation filter to store a data processed thereby;

a multiplier, having input terminals coupled to the Y first-in-first-out memory and X resolution register;

an adder, having input terminals coupled to the X first-in-first-out memory, the multiplier and a base address register, so as to output an address of the display memory;

a latch, coupled to a signal line AD of the PCI bus to latch a pixel data on the signal line AD;

a color key register, to store color key data;

a comparator, coupled to the latch and the color key register to compare the pixel data and color key data of the color key register; and a state machine, coupled to the comparator to handle the overall timing, after the pixel data is read on the signal line AD of the PCI bus, the input video is written to the display memory if a comparison result of the comparator observed by the state machine shows an allowance of overlay.

7. The radar scan converter according to claim 6, wherein the base address is an initial address of the display memory.

8. The radar scan converter according to claim 1, wherein the azimuth synchronous signal reflects an azimuth information of the radar video.

9. The radar scan converter according to claim 1, wherein the coordinate converter comprises a counter to calculate the polar coordinate which is to be converted into the Cartesian coordinate by the coordinate converter.

10. A method of image mixing, to overlay an input video onto a screen of a personal computer with an overlay processor pixel by pixel, the method comprising:

receiving the input video and a Cartesian coordinate;

reading a display memory in a graphic card of the personal computer according to the Cartesian coordinate; and writing the input video into the display memory when a pixel data read from the display memory does not contain either text or graphic.

11. The method according to claim 10, wherein the input video comprises a radar video.

12. The method according to claim 10, wherein the input video comprises a supersonic video.

13. The method according to claim 10, wherein the azimuth synchronous signal reflects an azimuth information of the input video.

14. The method according to claim 10, wherein the display memory is disposed on a video graphics array card.

* * * * *